(12) United States Patent
Kanaya et al.

(10) Patent No.: US 12,522,684 B2
(45) Date of Patent: Jan. 13, 2026

(54) ACTIVE-ENERGY-RAY-CURABLE RESIN COMPOSITION AND CURED PRODUCT THEREOF

(71) Applicant: NIPPON SHOKUBAI CO., LTD., Osaka (JP)

(72) Inventors: Aki Kanaya, Osaka (JP); Kento Taniguchi, Osaka (JP); Atsushi Tachibana, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 466 days.

(21) Appl. No.: 18/000,348

(22) PCT Filed: Jun. 2, 2020

(86) PCT No.: PCT/JP2020/021817
§ 371 (c)(1),
(2) Date: Nov. 30, 2022

(87) PCT Pub. No.: WO2021/245803
PCT Pub. Date: Dec. 9, 2021

(65) Prior Publication Data
US 2023/0220142 A1 Jul. 13, 2023

(51) Int. Cl.
*C08F 290/06* (2006.01)
*B33Y 70/00* (2020.01)

(52) U.S. Cl.
CPC .......... *C08F 290/061* (2013.01); *B33Y 70/00* (2014.12); *C08F 290/064* (2013.01); *C08F 290/067* (2013.01)

(58) Field of Classification Search
None
See application file for complete search history.

(56) References Cited

U.S. PATENT DOCUMENTS

| | | |
|---|---|---|
| 2012/0016095 A1 | 1/2012 | Saito et al. |
| 2014/0309327 A1 | 10/2014 | Nogami et al. |
| 2015/0291716 A1 | 10/2015 | Liu et al. |

FOREIGN PATENT DOCUMENTS

| | | |
|---|---|---|
| JP | 11-302593 | 11/1999 |
| JP | 2011-074068 | 4/2011 |
| JP | 2011-137123 | 7/2011 |
| JP | 2013-144798 | 7/2013 |
| JP | 2013-216736 | 10/2013 |
| JP | 2013-231164 | 11/2013 |
| JP | 2014-040585 | 3/2014 |
| JP | 5689628 B | 3/2015 |
| JP | 2015-063666 | 4/2015 |
| JP | 2016-505489 | 2/2016 |
| JP | 5977063 B2 * | 8/2016 |
| JP | 2016-190962 | 11/2016 |
| JP | 2020-002201 | 1/2020 |
| JP | 7240884 B | 3/2023 |
| WO | 2010/114077 | 10/2010 |
| WO | 2011/105069 | 9/2011 |
| WO | 2013/073364 | 5/2013 |

* cited by examiner

*Primary Examiner* — Sanza L. McClendon
(74) *Attorney, Agent, or Firm* — HSML P.C.

(57) ABSTRACT

The present invention aims to provide a curable resin composition that can retain low viscosity and exhibit properties appropriate for application, even when the curable resin composition contains a high viscosity component. The present invention relates to an active energy ray-curable resin composition containing: a crosslinkable compound (A); an oligomer (B) having a viscosity at 25° C. of 1000 mPa·s or higher or a viscosity at 60° C. of 400 mPa·s or higher; and a polymerization initiator (C), the crosslinkable compound (A) being represented by the following formula (1):

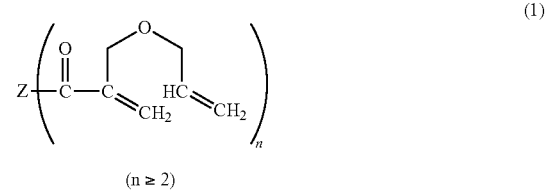

(n ≥ 2)

wherein Z is an n-valent linking group, with n being an integer of 2 or greater.

9 Claims, No Drawings

ACTIVE-ENERGY-RAY-CURABLE RESIN COMPOSITION AND CURED PRODUCT THEREOF

TECHNICAL FIELD

The present invention relates to active energy ray-curable resin compositions and a cured product of any of these compositions. More specifically, the present invention relates to an active energy ray-curable resin composition capable of providing a cured product that retains low viscosity and has desired physical properties, and a cured product of the composition.

BACKGROUND ART

Curable resin compositions that can be cured by heat or active energy rays can exhibit various properties depending on their formulations, and are used for a wide variety of applications such as coatings, inks, adhesives, resists, and various molding materials, for example.

Such curable resin compositions contain polymerizable compounds having polymerizable groups that can be cured by heat or active energy rays. Known polymerizable compounds include crosslinkable compounds, which are multifunctional compounds having multiple polymerizable or curable groups such as (meth)acryloyl groups and alkylallyl ether groups. The crosslinkable compounds have different polymerization mechanisms depending on the types of their functional groups, and are used in various fields taking advantage of their characteristics. For example, crosslinkable compounds having (meth)acryloyl groups as polymerizable groups are excellent in curing speed, internal curability, durability of chemical bonds formed, economic efficiency, and the like, and are usable in a wide range of applications such as coating materials, adhesives, sealants, cohesive agents, coatings, inks, resists, dental materials, lenses, and molding materials.

For example, as such crosslinkable compounds, Patent Literature 1 discloses a compound having an α-allyloxymethylacryloyl group. The crosslinkable compound disclosed in Patent Literature 1 has both a radical polymerization mechanism in which curing is inhibited by oxygen and an oxidative polymerization mechanism that requires oxygen, and it can exhibit a high degree of curability. Thus, the crosslinkable compound is excellent in curing speed, internal curability, surface curability, and thin-film curability.

CITATION LIST

Patent Literature

Patent Literature 1: JP 5689628 B

SUMMARY OF INVENTION

Technical Problem

Curable resin compositions are cured to be cured products having various properties, and thus include various polymerizable compounds in combination. However, use of a high viscosity component provides a high viscosity curable resin composition, which has problems such as difficulty in handling. Such a problem limits the usable design range of curable resin compositions. In recent years, curable resin compositions and cured products thereof, which are applied in various technical fields, have been required to have higher performance effective in a wider range. To meet such a requirement, various curable resin compositions are desirably designed freely without being limited by viscosity or other factors.

The present invention has been made in view of the current state of art and aims to provide a curable resin composition that can retain low viscosity and exhibit performance appropriate for application, even when the curable resin composition contains a high viscosity component.

Solution to Problem

The present inventors have made various examinations on curable resin compositions and found that a curable resin composition containing a crosslinkable compound having a specific structure, a high viscosity component, and a polymerization initiator can provide a cured product that retains low viscosity and has properties such as thermal degradation resistance, hardness, adhesion, or weather resistance, appropriate for application. Thereby, the present invention has been completed.

That is, the present invention relates to an active energy ray-curable resin composition containing:
a crosslinkable compound (A);
an oligomer (B) having a viscosity at 25° C. of 1000 mPa·s or higher or a viscosity at 60° C. of 400 mPa·s or higher; and
a polymerization initiator (C),
the crosslinkable compound (A) being represented by the following formula (1):

[Chem. 1]

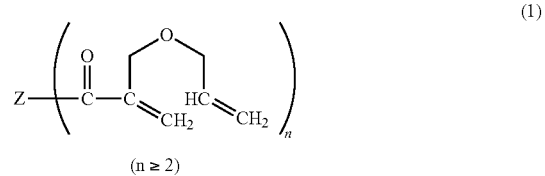

(n ≥ 2)

wherein Z is an n-valent linking group, with n being an integer of 2 or greater.

Preferably, in the active energy ray-curable resin composition, the oligomer (B) has a viscosity at 25° C. of 1000 mPa·s or higher and a viscosity at 60° C. of 400 mPa·s or higher.

Preferably, the oligomer (B) includes at least one selected from the group consisting of polyester (meth)acrylates, epoxy (meth)acrylates, urethane (meth)acrylates, and polyacrylic (meth)acrylates.

Preferably, the active energy ray-curable resin composition further contains a reactive diluent.

Preferably, in the active energy ray-curable resin composition, the crosslinkable compound (A) and the oligomer (B) are present in a content ratio [(A)/(B)] by mass of 1/100 to 100/1.

Preferably, the active energy ray-curable resin composition further contains a compound represented by the following formula (3):

[Chem. 2]

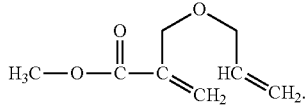
$$(3)$$

Preferably, the active energy ray-curable resin composition is a 3D modeling resin composition.

The present invention also relates to use of the active energy ray-curable resin composition for production of a 3D modeling material.

The present invention also relates to a cured product containing the active energy ray-curable resin composition.

Advantageous Effects of Invention

The active energy ray-curable resin composition of the present invention can achieve both viscosity and desired properties, which tend to be in a trade-off relationship, in a balanced manner. The active energy ray-curable resin composition of the present invention can provide a cured product having properties required and appropriate for application, such as thermal degradation resistance, hardness, adhesion, toughness, or weather resistance. The active energy ray-curable resin composition and a cured product thereof of the present invention are suitable for industrial materials in a wide range of fields, including coating agents, inks, sealants, coatings, adhesives, and molding materials.

DESCRIPTION OF EMBODIMENTS

The present invention is described in detail below.

A combination of two or more of individual preferred embodiments of the present invention described below is also a preferred embodiment of the present invention.

Herein, "(meth)acrylate" means "acrylate and/or methacrylate" and "(meth)acrylic acid" means "acrylic acid and/or methacrylic acid".

1. Active Energy Ray-Curable Resin Composition

The present invention relates to an active energy ray-curable resin composition containing:
a crosslinkable compound (A);
an oligomer (B) having a viscosity at 25° C. of 1000 mPa·s or higher or a viscosity at 60° C. of 400 mPa·s or higher; and
a polymerization initiator (C),
the crosslinkable compound (A) being represented by the following formula (1):

[Chem. 3]

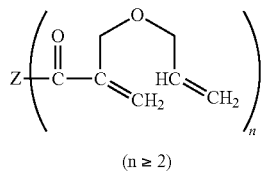
$$(1)$$
$(n \geq 2)$ wherein Z is an n-valent linking group, with n being an integer of 2 or greater.

The active energy ray-curable resin composition of the present invention having the above-described features can retain low viscosity and achieve required physical properties. This is because the crosslinkable compound has an ether structure and is thus a relatively low viscosity component; and the crosslinkable compound can keep the viscosity of the curable resin composition low, even when the curable resin composition contains a high viscosity component. In addition, the polymerizable group of the crosslinkable compound is cured to form a ring structure and an ethylene chain. Thus, properties such as hardness, thermal degradation resistance, toughness, adhesiveness, and weather resistance are exhibited.

The following describes components contained in the active energy ray-curable resin composition of the present invention.

(A) Crosslinkable Compound

The active energy ray-curable resin composition (also referred to as "the curable resin composition of the present invention") contains a crosslinkable compound represented by the following formula (1):

[Chem. 4]

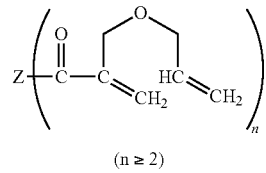
$$(1)$$
$(n \geq 2)$ wherein Z is an n-valent linking group, with n being an integer of 2 or greater.

In the formula (1), n may be, but is not limited to, an integer of 2 or greater. From the viewpoint of ease of synthesis and storage stability, n is preferably 2 to 100, more preferably 2 to 50. When the curable resin composition of the present invention is used in applications requiring low viscosity, such as reactive diluents, n is still more preferably 2 to 10, most preferably 2 to 6. When the curable resin composition of the present invention is used in applications requiring film-forming properties, such as binder resins for coatings and inks, n is still more preferably 5 to 50, most preferably 10 to 50.

In the formula (1), Z is not limited as long as it is a linking group capable of forming two or more covalent bonds with the carbonyl groups of an α-allyloxymethylacryloyl group (hereinafter also referred to as "AMA group"), that is, a covalent divalent or higher-valent linking group. The linking group may be a divalent or higher-valent linking group forming a bond through one atom, or a divalent or higher-valent linking group forming a bond through two or more atoms. From the viewpoint of ease of synthesis and chemical stability, preferred is a divalent or higher-valent linking group forming a bond through two or more atoms.

The AMA group is a group represented by the following formula (2).

[Chem. 5]

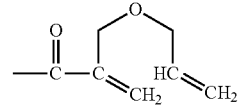
Formula (2)

When Z is a divalent or higher-valent linking group forming a bond through one atom, Z may be, but is not limited to, a linking group containing any of the following atoms: atoms from Group 16 of the Periodic table, such as oxygen and sulfur atoms; atoms from Group 15 of the Periodic table, such as nitrogen and phosphorus atoms; and atoms from Group 14 of the Periodic table, such as carbon, silicon, and germanium atoms, for example. Specific examples of the linking group include the structures listed in the following structural formula group (3).

[Chem. 6]

Structural formula group (3)

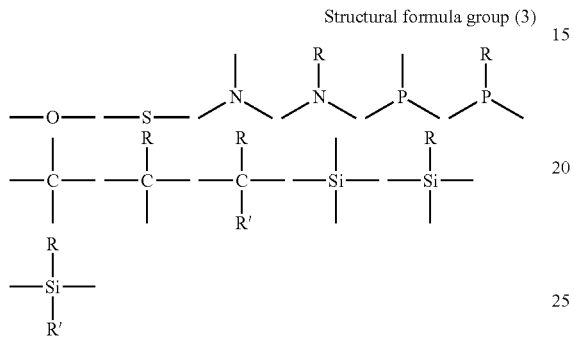

In the formulas, R and R' are each a hydrogen atom or an organic group, and R and R' may be the same as or different from each other. The organic group is any monovalent organic group capable of binding to any of the above-described atoms, preferably an optionally substituted C1-C30 hydrocarbon group.

When Z is a divalent or higher-valent linking group forming a bond through two or more atoms, Z may have a low-molecular structure or a high-molecular structure. The term "low-molecular structure" or the term "low-molecular backbone", which is described below, usually means a structure or backbone that contains no repeating units of monomer units, while the term "high-molecular structure" or the term "high-molecular backbone", which is described below, usually means a structure or backbone that contains repeating units of monomer units.

Z contains at least a backbone Q, and optionally a divalent linking group X binding an AMA group to the backbone Q, a divalent or higher-valent linking group Y binding two or more backbones Q, or a monovalent substituent W binding directly to the backbone Q. In the n-valent linking group Z, n hydrogen atoms in the backbone Q may be replaced by AMA groups or the linking groups X, and the remaining hydrogen atoms may be replaced by the linking groups Y and/or W.

Examples of a crosslinkable compound containing two AMA groups include the structures listed in the following structural formula group (4).

For simplicity, the AMA group is represented by A in the formulas, and the following structures are some examples of the crosslinkable compounds, and the crosslinkable compounds are not limited to the structures.

[Chem. 7]

Structural formula group (4)

(a) Cases where Z consists of Q

A—Q—A   A—Q$^1$—Q$^2$—A

-continued (b) Cases where Z contains Q and X

A—Q—X—A   A—X$^1$—Q—X$^2$—A

A—X$^1$—Q$^1$—Q$^2$—X$^2$—A (c) Cases where Z contains Q and Y

A—Q$^1$—Y—Q$^2$—A   A—Q$^1$—Y—Q$^2$—X—A

A—X$^1$—Q$^1$—Y—Q$^2$—X$^2$—A

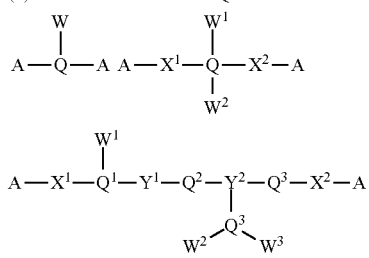

(d) Cases where Z contains Q and W

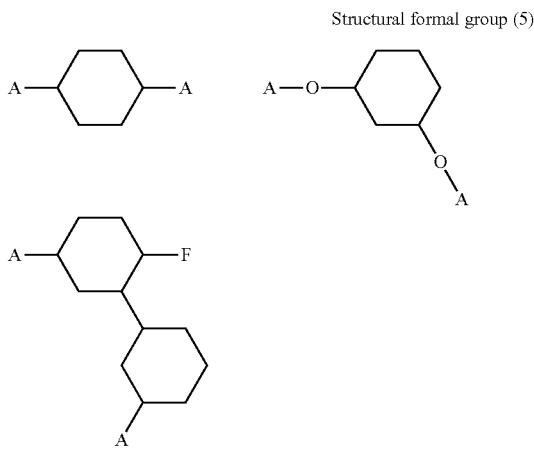

In the formulas, Q$^n$, X$^n$, Y$^n$, and W$^n$ (n is an integer of 1 or greater) represent Q, X, Y, and W at the nth position, respectively, when n number of backbones Q, n number of linking groups X, n number of linking groups Y, or n number of linking groups W are present. The n number of backbones Q, the n number of linking groups X, the n number of linking groups Y, or the n number of linking groups W may be the same as or different from each other. Specific examples of a crosslinkable compound containing two AMA groups, where Q is a cyclohexane backbone, X is an oxygen atom, Y is a urethane bond, and W is a fluorine atom include compounds listed in the following structural formula group (5). The compounds listed in the structural formula group (5) are some examples, but not all, of crosslinkable compounds. As listed in the structural formula group (5), two of the hydrogen atoms of the cyclohexane backbone may be replaced by AMA groups or the linking groups X, and the remaining hydrogen atoms may be replaced by the linking groups Y and/or W.

[Chem. 8]

Structural formal group (5)

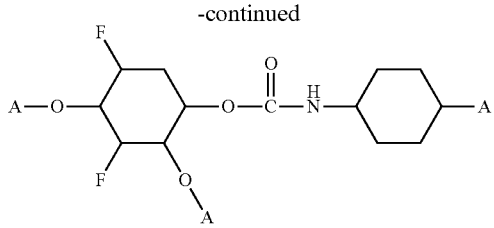

As described above, Z contains a backbone Q, and optionally a divalent linking group X binding an AMA group to the backbone Q, a divalent or higher-valent linking group Y binding two or more backbones Q, or a monovalent substituent W binding directly to the backbone Q. When Z contains two or more backbones Q, the backbones Q may directly bind to each other without a linking group Y therebetween. Z may consist of backbone(s) Q. In other word, the AMA group may bind directly to the backbone Q. From the viewpoint of ease of synthesis, availability of raw materials, and chemical stability, preferably, Z contains at least Q and X, in other words, the AMA group binds to Q through X, and more preferably, the carbonyl group of the AMA group binds to X through a heteroatom. In other words, Z is preferably an n-valent linking group that binds to the AMA group through a heteroatom. Y and W are appropriately selected according to performances required for the synthesis methods and the applications. Z may contain two or more backbones Q, two or more linking groups X, two or more linking groups Y, or two or more linking groups W.

The following describes specific examples of Q, X, Y, and W, but Q, X, Y, and W are not limited thereto. Examples of the backbone Q are listed below in the form of a compound. When the backbone Q constitutes Z, the backbone Q has such a structure that two or more hydrogen atoms in the backbone Q in the form of a compound are replaced by atoms or atomic groups binding to the backbone Q (i.e., an AMA group, Q, X, Y, or W). Q, X, Y, and W are constituents of Z. The constituents of Z are not limited to compounds that can constitute Q, X, Y, or W. The following describes examples of the structures of Q, X, Y, and W resolved from the structure Z and the structures in the form of a compound.

The backbone Q contains two or more atoms forming the backbone, and to the backbone can bind an AMA group and/or X. In the backbone Q in the form of a compound, two or more atoms forms the backbone, and two or more hydrogen atoms (i.e., hydrogen atoms that can be replaced by an AMA group and/or X) bind to each atom forming the backbone. The backbone Q is not limited as long as it can be a backbone of Z having a structure in which the hydrogen atoms are replaced by an AMA group and/or X. The following describes the structures of the backbone Q in the form of a compound, for example.

Examples of the structures of the backbone Q include low-molecular backbones such as: saturated hydrocarbon structures such as ethane, propane, butane, pentane, hexane, heptane, octane, nonane, decane, undecane, dodecane, tridecane, tetradecane, pentadecane, hexadecane, heptadecane, octadecane, nonadecane, and eicosane; hydrocarbon monoene structures such as ethylene, propene, butene, pentene, hexene, nonene, decene, undecene, dodecene, tridecene, tetradecene, pentadecene, hexadecene, heptadecene, octadecene, nonadecene, and eicosene; hydrocarbon diene structures such as allene, butadiene, pentadiene, hexadiene, nonadiene, decadiene, undecadiene, dodecadiene, tridecadiene, tetradecadiene, pentadecadiene, hexadecadiene, heptadecadiene, octadecadiene, nonadecadiene, and eicosadiene; hydrocarbon polyene structures such as heptadecatriene, heptadecatetraene, octadecatriene, and octadecatetraene; acetylene structures such as acetylene, methylacetylene, and hexadiyne; alicyclic structures such as cyclopentane, cyclopentene, cyclopentadiene, cyclohexane, cyclohexene, cyclohexadiene, norbornane, norbornene, norbornadiene, cyclodecane, dicyclopentadiene, adamantane, cyclopentanone, cyclohexanone, cyclooctanone, and various compounds listed in the following chemical formula group (6):

[Chem. 9]

Chemical formula group (6)

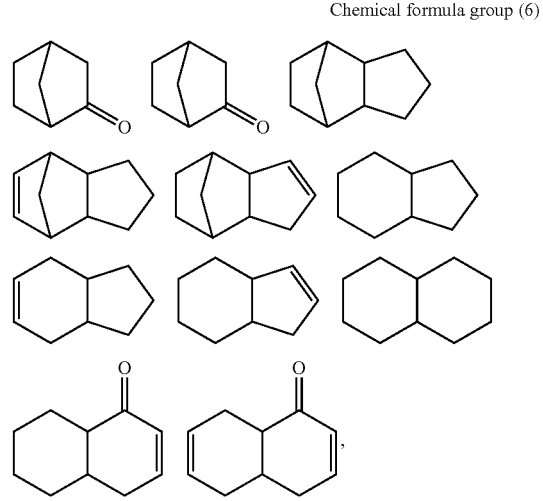

aromatic hydrocarbon structures such as benzene, naphthalene, anthracene, phenanthrene, tetracene, chrysene, triphenylene, pyrene, perylene, biphenyl, and various compounds listed in the following chemical formula group (7):

[Chem. 10]

Chemical formula group (7)

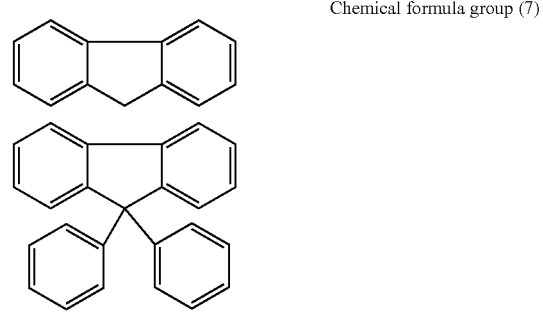

heterocyclic structures such as ethylene oxide, ethyleneimine, oxetane, tetrahydrofuran, tetrahydropyran, dihydrofuran, dihydropyran, pyran, dioxane, pyrrolidine, piperidine, piperazine, morpholine, γ-lactone, δ-lactone, ε-caprolactone, γ-lactam, δ-lactam, ε-caprolactam, oxazoline, succinic anhydride, maleic anhydride, succinimide, maleimide, glutaric anhydride, glutarimide, and various compounds listed in the following chemical formula group (8):

[Chem. 11]

Chemical formula group (8)

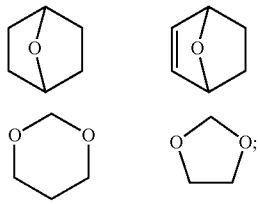

and heteroaromatic structures such as pyrrole, furan, thiophene, imidazole, oxazole, thiazole, pyrazole, isoxazole, isothiazole, pyridine, pyridazine, pyrazine, benzofuran, indole, benzimidazole, benzoxazole, benzothiazole, quinoline, quinoxaline acridine, pyrimidine, triazine, carbazole, phenothiazine, quinacridone, xanthene, cyanuric acid, phthalic anhydride, phthalimide, and various compounds listed in the following chemical formula group (9):

[Chem. 12]

Chemical formula group (9)

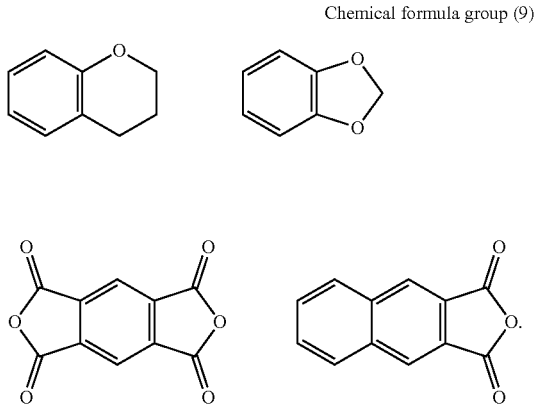

Other examples of the structures of the backbone Q include high-molecular backbones such as: a polyethylene backbone represented by the following formula (10), obtainable by (co)polymerization of acyclic ethylenic compounds such as ethylene, propylene, styrene, methyl acrylate, methyl methacrylate, and vinyl acetate, the formula (10) being as follows:

[Chem. 13]

Formula (10)

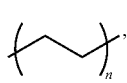

various backbones having a ring structure in the main chain listed in the following structural formula group (11), obtainable by (co)polymerization of unsaturated cyclic compounds typified by cycloalkenes such as norbornene, unsaturated acid anhydrides such as maleic anhydride, and maleimides such as phenylmaleimide, the structural formula group (11) being as follows:

[Chem. 14]

Structural formula group (11)

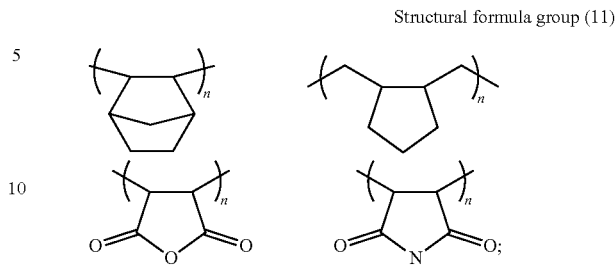

and polyethylene copolymer backbones having a ring structure in the main chain obtainable by copolymerization of the acyclic ethylenic compounds and unsaturated cyclic compounds; polyether backbones having an ether bond in the main chain, obtainable by dehydration-condensation (co)polymerization of diols or ring-opening (co)polymerization of alkylene oxides such as ethylene oxide, propylene oxide, and tetrahydrofuran; polyester backbones having an ester bond in the main chain, obtainable by dehydration-condensation (co)polymerization of dicarboxylic acids with diols or ring-opening (co)polymerization of cyclic lactones; polyamide backbones having an amide bond in the main chain, obtainable by dehydration-condensation (co)polymerization of dicarboxylic acids with diamines or ring-opening (co) polymerization of cyclic lactams; polysiloxane backbones having a siloxane bond in the main chain, obtainable by dealcoholization condensation (co)polymerization of dialkyl dialkoxysilanes or ring-opening (co)polymerization of cyclic siloxanes; and polyurethane backbones having a urethane structure in the main chain, obtainable by reaction of diisocyanate with diols.

The backbone Q can be appropriately selected depending on the application of the crosslinkable compound. The low-molecular backbones are preferred for applications requiring low viscosity, such as reactive diluents, while the high-molecular backbones are preferred for applications requiring film-forming properties, such as binder resins for coatings and resist materials. Different backbones are used depending on the application. Preferred low-molecular backbones include at least one structure selected from the group consisting of saturated hydrocarbon structures, alicyclic structures, and aromatic hydrocarbon structures, from the viewpoint of factors including availability of raw materials and chemical stability. Preferred high-molecular backbones include at least one backbone selected from the group consisting of polyethylene backbones, polyethylene copolymer backbones having a ring structure in the main chain, and polyether backbones, from the viewpoint of factors including ease of synthesis and chemical stability.

The linking group X is not limited as long as it is a divalent linking group. Examples thereof include bonds in the following structural formula group (12). The following structural formulas are examples represented by A-X-Q, where X is replaced by an atom or atomic group.

[Chem. 15]

Structural formula group (12)

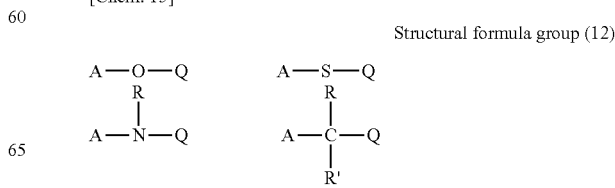

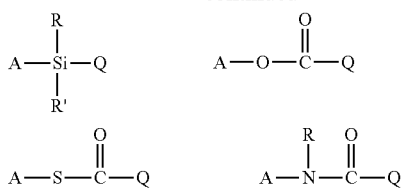

In the formulas, R and R' are the same as or different from each other and are each a hydrogen atom, an optionally substituted C1-C30 alkyl group, or an optionally substituted C1-C30 aryl group.

Of these, X is preferably an oxygen atom, a sulfur atom, a mono-substituted nitrogen atom, or a disubstituted carbon atom, more preferably an oxygen atom or a mono-substituted nitrogen atom from the viewpoint of ease of synthesis and chemical stability. In other words, the A-X bond is preferably an ester bond or an amide bond. When two or more linking groups X are present in Z, they may consist of one type or two or more types.

The linking group Y is not limited as long as it is a divalent or higher-valent linking group, and examples thereof include bonds in the following structural formula group (13).

[Chem. 16]

Structural formula group (13)

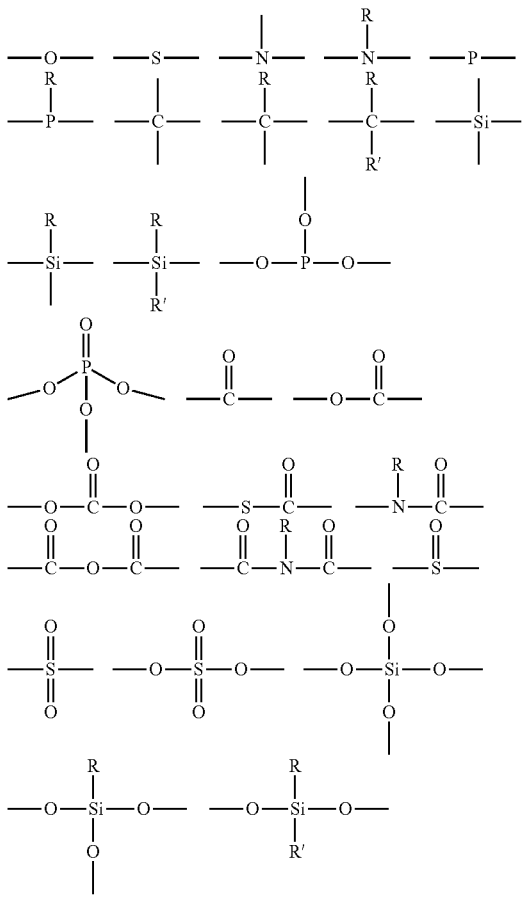

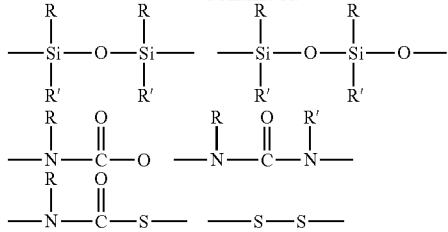

In the formulas, R and R' are the same as or different from each other and are each a hydrogen atom, an optionally substituted C1-C30 alkyl group, or an optionally substituted C1-C30 aryl group.

Of these, Y is preferably an ether bond, a thioether bond, a bond with a divalent to tetravalent carbon atom, a ketonic bond, an ester bond, an amide bond, a urethane bond, or a silicic acid ester bond, more preferably an ether bond, a bond with a divalent to tetravalent carbon atom, an ester bond, an amide bond, or a urethane bond, from the viewpoint of ease of synthesis and chemical stability. When two or more linking groups Y are present in Z, they may consist of one type or two or more types.

The substituent W is not limited as long as it is a monovalent substituent capable of binding to the backbone Q.

Examples of W include atoms from Group 17 of the periodic table, such as fluorine, chlorine, bromine, and iodine atoms; saturated hydrocarbon groups such as methyl, ethyl, n-propyl, i-propyl, n-butyl, s-butyl, t-butyl, n-amyl, s-amyl, t-amyl, n-hexyl, s-hexyl, n-heptyl, n-octyl, s-octyl, t-octyl, 2-ethylhexyl, caprylic, nonyl, decyl, undecyl, lauryl, tridecyl, myristyl, pentadecyl, cetyl, heptadecyl, stearyl, nonadecyl, eicosyl, seryl, and melicyl; unsaturated hydrocarbon groups such as vinyl, allyl, methallyl, crotyl, and propagyl; alicyclic hydrocarbon groups such as cyclopentyl, cyclohexyl, 4-methylcyclohexyl, 4-t-butylcyclohexyl, tricyclodecanyl, isobornyl, adamantyl, and dicyclopentadienyl; aromatic hydrocarbon groups such as phenyl, methylphenyl, dimethylphenyl, trimethylphenyl, 4-t-butylphenyl, naphthyl, and anthranil; alkoxy groups such as hydroxy, methoxy, ethoxy, propoxy, butoxy, phenoxy, and naphthoxy groups; amino groups such as amino, methylamino, dimethylamino, methylethylamino, and methylphenylamino groups; a (meth)acryloyl group; a mercapto group; a thioalkoxy group; a cyano group; a nitro group; an isocyanato group; a thiocyanato group; quaternary ammonium salt groups of an amino group; a carboxy group and its salts; a sulfonic acid group and its salts; a sulfinic acid group and its salts; and a phosphoric acid group and its salts. These are used depending on the application.

Preferred examples of the crosslinkable compound include compounds represented by the following formulas (z1) to (z3):

$$A\text{-}O\text{—}R^1\text{—}O\text{-}A \qquad (z1)$$

wherein $R^1$ is a C1-C30 divalent hydrocarbon group, $-(R^2-O)_a-R^3-$, or $-(R^2-O)_a-R^3-(O-R^4)_b-$; $R^2$ and $R^4$ are the same as or different from each other and are each a C1-C10 divalent linear or branched saturated hydrocarbon group; $R^3$ is a C1-C20 divalent hydrocarbon group; a is an integer of 1 to 20; b is an integer of 1 to 20; and A is an AMA group, $$[A\text{-}(O\text{—}R^5)_c]_m\text{—}R^6\text{—}[(R^7\text{—}O)_d\text{-}A]_n \qquad (z2)$$

wherein $R^5$ and $R^7$ are the same as or different from each other and are each a C1-C10 divalent linear or branched saturated hydrocarbon group; $R^6$ is any of the following groups:

[Chem. 17]

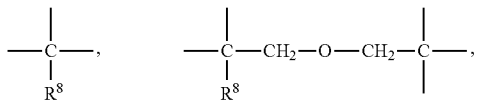

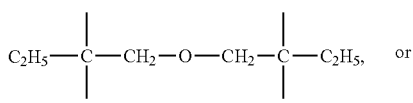

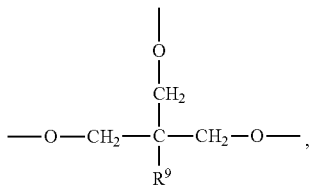

wherein $R^8$ and $R^9$ are the same as or different from each other and are each an optionally substituted C1-C20 linear or branched saturated hydrocarbon group; c is an integer of 1 to 20; d is an integer of 1 to 20; m and n are the same as or different from each other and are each an integer of 1 to 3; and A is an AMA group, and $$R^{10}-[(R^{11}-O)_e-A]_3 \qquad (z3)$$

wherein $R^{10}$ is a trivalent heterocyclic group or a cyclic hydrocarbon group; $R^{11}$ is a C1-C10 divalent linear or branched saturated hydrocarbon group; e is an integer of 1 to 20; and A is an AMA group.

In the formula (z1), $R^1$ is preferably a C1-C20 divalent hydrocarbon group, more preferably a C1-C15 divalent hydrocarbon group.

$R^2$ is preferably a C1-C5 divalent linear or branched saturated hydrocarbon group, more preferably a C1-C4 divalent linear or branched saturated hydrocarbon group.

$R^3$ is preferably a C1-C15 divalent hydrocarbon group, more preferably a C1-C10 divalent hydrocarbon group.

$R^4$ is preferably a C1-C5 divalent linear or branched saturated hydrocarbon group, more preferably a C1-C4 divalent linear or branched saturated hydrocarbon group.

In the formula (z1), the divalent hydrocarbon group may be a divalent linear, branched, or cyclic saturated hydrocarbon group or unsaturated hydrocarbon group.

Examples thereof include divalent hydrocarbon groups having an alkylene group, an arylene group, an aromatic ring, or an alicyclic structure. Examples of the alicyclic structure include cyclohexane, adamantane, and norbornene backbones.

Examples of the divalent linear or branched saturated hydrocarbon group in the formula (z1) include linear alkylene groups such as methylene, ethylene, propylene, butylene, pentylene, hexylene, and heptylene groups and branched alkylene groups such as $—C(CH_3)_2—$, $—CH(CH_3)—$, $—CH(CH_2CH_3)—$, $—C(CH_3)(CH_2CH_3)—$, and $—CH_2-CH(CH_3)—$.

In the formula (z1), a is preferably an integer of 1 to 10, more preferably an integer of 1 to 5.

The letter b is preferably an integer of 1 to 10, more preferably an integer of 1 to 5.

In the formula (z2), $R^5$ and $R^7$ are the same as or different from each other and are each preferably a C1-C5 divalent linear or branched saturated hydrocarbon group, more preferably a C1-C4 divalent linear or branched saturated hydrocarbon group.

Examples of the divalent linear or branched saturated hydrocarbon group include the examples listed for the divalent linear or branched saturated hydrocarbon group in the formula (z1).

$R^8$ and $R^9$ are the same as or different from each other and are each preferably an optionally substituted C1-C15 monovalent linear or branched saturated hydrocarbon group, more preferably a C1-C10 monovalent linear or branched saturated hydrocarbon group.

Examples of the monovalent linear or branched saturated hydrocarbon group in the formula (z2) include linear or branched alkyl groups such as methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2 dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,2,2-trimethylpropyl, 1-ethyl-1-methylpropyl, 1-ethyl-2-methylpropyl, and n-heptyl.

Examples of the substituent include a hydroxyl group, an alkyl group, and an alkoxyl group.

In the formula (z2), c is preferably an integer of 1 to 10, more preferably an integer of 1 to 5.

The letter d is preferably an integer of 1 to 10, more preferably an integer of 1 to 5.

The letters m and n are the same as or different from each other and are each an integer of 1 to 3, and m+n is preferably an integer of 3 to 6.

In the formula (z3), $R^{10}$ is a trivalent heterocyclic group or a cyclic hydrocarbon group. The carbon number of $R^{10}$ is preferably 3 to 15, more preferably 3 to 10.

Examples of the trivalent heterocyclic group or the cyclic hydrocarbon group include trivalent groups having any of the alicyclic structures, aromatic hydrocarbon structures, heterocyclic structures, and heteroaromatic structures, which are described above, and groups having an isocyanuric acid backbone. Preferred among these are groups having an isocyanuric acid backbone.

$R^{11}$ is preferably a C1-C10 divalent linear or branched saturated hydrocarbon group, more preferably a C1-C5 divalent linear or branched saturated hydrocarbon group.

Examples of the divalent linear or branched saturated hydrocarbon group include the examples listed for the divalent linear or branched saturated hydrocarbon group in the formula (z1).

The letter e is preferably an integer of 1 and 10, more preferably an integer of 1 and 5.

Specific examples of the crosslinkable compound include compounds represented by the following formulas:
[Chem. 18]
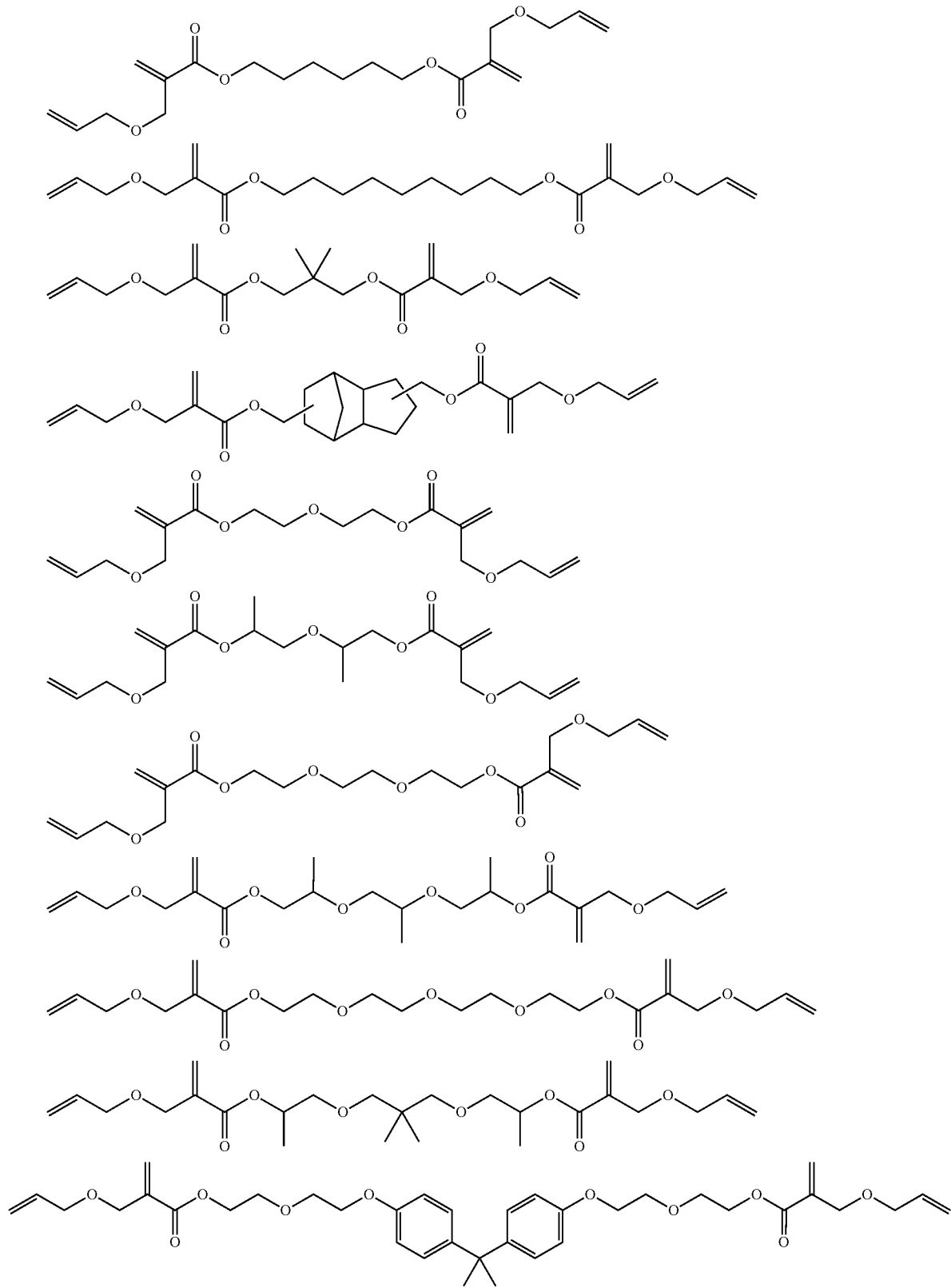

[Chem. 19]
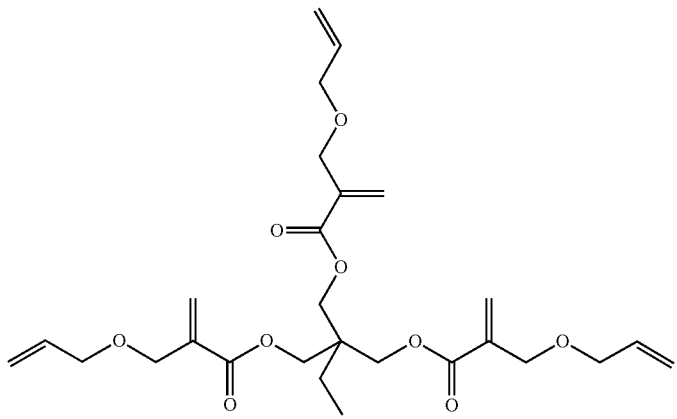
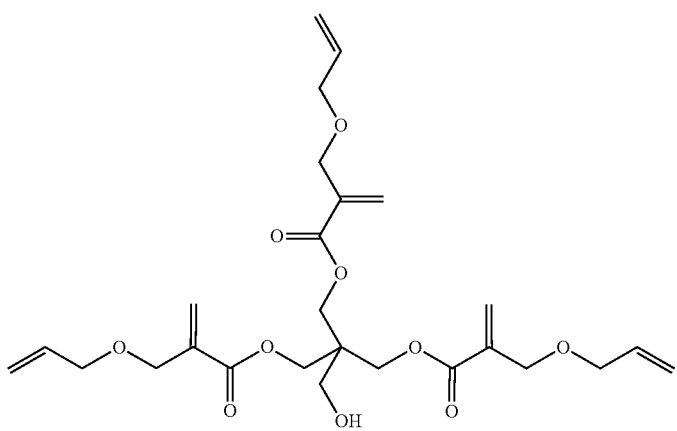
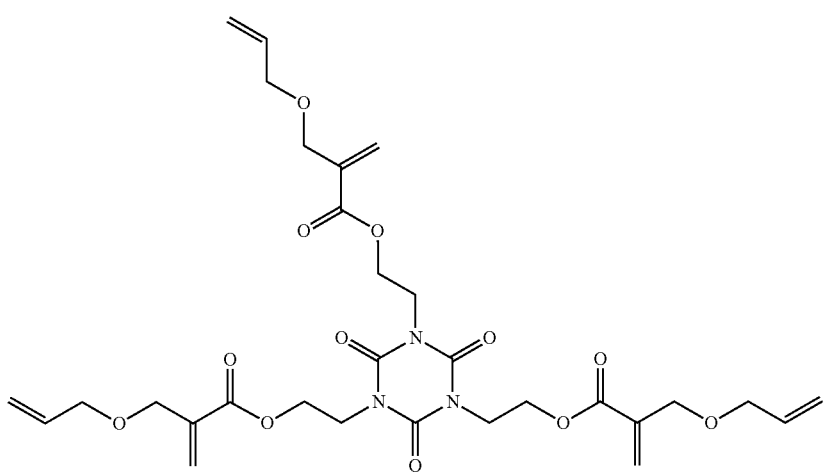

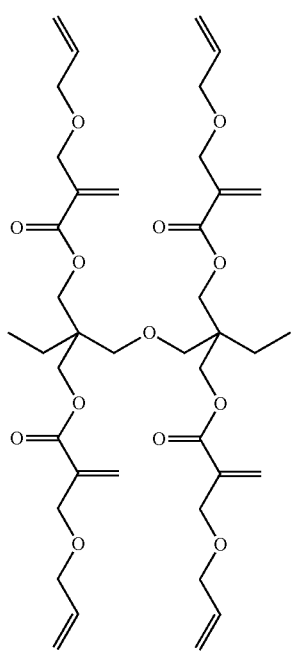
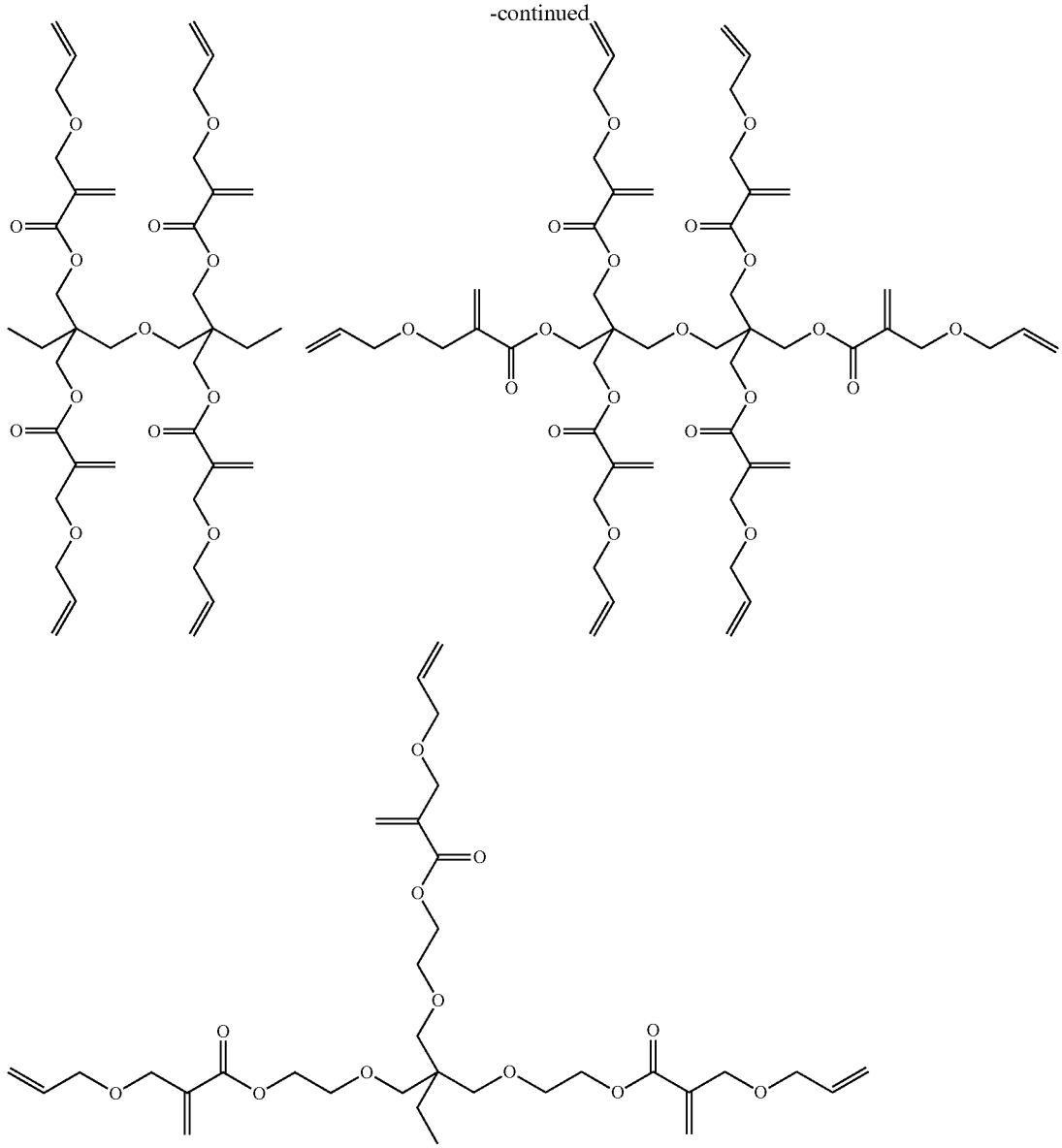

The crosslinkable compound may be produced by any known method that can provide any of the above-described crosslinkable compounds. An example of the method is a production method of a crosslinkable compound described in JP 5689628 B.

The curable resin composition of the present invention may contain one or more of the crosslinkable compounds.

The amount of the crosslinkable compound(s) in the curable resin composition of the present invention may be appropriately designed depending on the purpose and application of the curable resin composition. The amount of the crosslinkable compound(s) is preferably 0.05 to 99% by mass, more preferably 0.1% by mass or more, still more preferably 0.5% by mass or more, based on 100% by mass of solids content of the curable resin composition. The amount of the crosslinkable compound(s) is more preferably 95% by mass or less, still more preferably 90% by mass or less, based on 100% by mass of solids content of the curable resin composition.

The solids content means a total amount of components that form a cured product (excluding components that volatilize during formation of the cured product, such as solvents).

When the curable resin composition of the present invention is used as a 3D modeling resin composition, the amount of the crosslinkable compound(s) is 5 to 50% by mass, more preferably 10 to 40% by mass, still more preferably 10 to 35% by mass, based on 100% by mass of solids content of the curable resin composition.

(B) Oligomer

The active energy ray-curable resin composition of the present invention further contains an oligomer having a viscosity at 25° C. of 1000 mPa·s or higher or a viscosity at 60° C. of 400 mPa·s or higher. The curable resin composition of the present invention can retain low viscosity even when containing the above-described oligomer having a relatively high viscosity.

The oligomer preferably has a viscosity at 25° C. of 1100 mPa·s or higher, more preferably 1200 mPa·s or higher. The upper limit of the viscosity at 25° C. of the oligomer is not limited, and is preferably 6000000 mPa·s or lower from the viewpoint of handling.

The oligomer preferably has a viscosity at 60° C. of 420 mPa·s or higher, more preferably 450 mPa·s or higher. The upper limit of the viscosity at 60° C. of the oligomer is not limited, and is preferably 200000 mPa·s or lower from the viewpoint of handling.

The oligomer more preferably has a viscosity at 25° C. within the range indicated above and a viscosity at 60° C. within the range indicated above.

In other words, the oligomer still more preferably has a viscosity at 25° C. of 1000 mPa·s or higher and a viscosity at 60° C. of 400 mPa·s or higher, particularly preferably has a viscosity at 25° C. of 1100 mPa·s or higher and a viscosity at 60° C. of 420 mPa·s or higher.

In the present invention, the viscosity is a value measured at a given temperature using a viscometer such as a cone-plate viscometer (TV-20L available from Toki Sangyo Co., Ltd.).

The oligomer may be any one having a viscosity within the range indicated above, and preferred examples thereof include polyester (meth)acrylates, epoxy (meth)acrylates, urethane (meth)acrylates, polyacrylic (meth)acrylates, dendrimers (hyperbranched polymers), polybutadiene (meth)acrylates, silicon (meth)acrylates, and amino resin (meth)acrylates. These may be used alone or in combination of two or more. Of these, the oligomer more preferably includes at least one selected from the group consisting of polyester (meth)acrylates, epoxy (meth)acrylates, urethane (meth)acrylates, and polyacrylic (meth)acrylates.

Examples of the polyester (meth)acrylates include (meth)acrylated products of polyester polyols obtainable from polyols and polybasic acids. These compounds are obtainable, for example, by esterification reaction of a hydroxyl group at an end or in the main chain of a polyester obtained by polycondensation of polybasic acids and polyhydric alcohols in the main chain backbone with a (meth)acrylate having one or more carboxy groups in the molecule such as (meth)acrylic acid.

Examples of the polybasic acids include aliphatic polybasic acids such as oxalic acid, succinic acid, malonic acid, adipic acid, sebacic acid, azelaic acid, maleic acid, fumaric acid, itaconic acid, succinic anhydride, and maleic anhydride; alicyclic polybasic acids such as dimeric acid, cyclohexanedicarboxylic acid, and tetrahydrophthalic anhydride; and aromatic polybasic acids such as phthalic acid, isophthalic acid, terephthalic acid, biphenyldicarboxylic acid, trimellitic acid, and pyromellitic acid.

Examples of the polyhydric alcohols include glycol, hexanediol, diethylene glycol, tripropylene glycol, cyclohexanedimethanol, and polyols.

Specific examples of the polyester (meth)acrylates include ARONIX M-7100 and ARONIX M-8560 (both available from Toagosei Co., Ltd.) and EBECRYL 884 (DAICEL-ALLNEX LTD.).

Examples of the epoxy (meth)acrylates include addition reaction products of oxirane ring-containing compounds and carboxy group-containing (meth)acrylates.

Examples of the oxirane ring-containing compounds include aromatic epoxy compounds such as bisphenol epoxy compounds, aliphatic epoxy compounds such as diglycidyl ethers of C2-C20 diols, and alicyclic epoxy compounds.

Examples of the carboxy group-containing (meth)acrylates include (meth)acrylic acid, β-carboxyethyl (meth)acrylate, mono(2-acryloyloxyethyl) succinate, mono (2-meth-acryloyloxyethyl) succinate, a (meth)acrylic acid dimer, and modified caprolactam (meth)acrylate.

Specific examples of the epoxy (meth)acrylates include bisphenol epoxy acrylates, novolac epoxy acrylates, aliphatic epoxy acrylates, and glycidyl ester acrylates.

Examples of the urethane (meth)acrylates include addition reaction products of organic isocyanates, hydroxyl group-containing (meth)acrylic acid esters, and polyhydric alcohols.

Examples of the organic isocyanates include aliphatic isocyanates such as butane diisocyanate, pentane diisocyanate, and hexamethylene diisocyanate; alicyclic isocyanates such as cyclohexyl isocyanate, isophorone diisocyanate, and hydrogenated diphenylmethane diisocyanate; and aromatic isocyanates such as tolylene diisocyanate, xylylene diisocyanate, and diphenylmethane diisocyanate.

Examples of the hydroxyl group-containing (meth)acrylic acid esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and 2,3-hydroxypropyl (meth)acrylate.

Examples of the polyhydric alcohols include ethylene glycol, propylene glycol, diethylene glycol, triethylene glycol, dipropylene glycol, tripropylene glycol, neopentyl glycol, pentanediol, and butanediol.

Specific examples of the urethane (meth)acrylates include EBECRYL 230 (DAICEL-ALLNEX LTD.); CN929 and CN964 (both available from Sartomer); and SHIKOH (registered trademark), UV-1700B, SHIKOH UV-3000B, SHIKOH UV-7000B, and SHIKOH UV-7650B (all available from Mitsubishi Chemical Corp.).

Examples of the polyacrylic (meth)acrylates include polymers obtained by adding acryloyl groups to copolymerized acrylic polymers of acrylic monomers or vinyl monomers.

Specific examples of the polyacrylic acrylates include those obtainable by adding (meth)acrylic acids to polymers obtained by polymerization of (meth)acrylic acid esters and epoxy group-containing (meth)acrylates and those obtainable by adding epoxy group-containing (meth)acrylates to polymers obtained by polymerization of (meth)acrylic acid esters and (meth)acrylic acids.

Examples of the (meth)acrylic acid esters include methyl (meth)acrylate, ethyl (meth)acrylate, n-propyl (meth)acrylate, i-propyl (meth)acrylate, n-butyl (meth)acrylate, s-butyl (meth)acrylate, n-amyl (meth)acrylate, s-amyl (meth)acrylate, n-hexyl (meth)acrylate, 2-ethylhexyl (meth)acrylate, isodecyl (meth)acrylate, tridecyl (meth)acrylate, octyl (meth)acrylate, isooctyl (meth)acrylate, lauryl (meth)acrylate, stearyl (meth)acrylate, cyclohexyl (meth)acrylate, isobornyl (meth)acrylate, tetrahydrofurfuryl (meth)acrylate, dicyclopentanyl (meth)acrylate, 2-methoxyethyl (meth)acrylate, 2-ethoxyethyl (meth)acrylate, and 2-phenoxyethyl (meth)acrylate.

Specific examples of the epoxy group-containing (meth)acrylates include glycidyl (meth)acrylate, β-methylglycidyl (meth)acrylate, β-ethylglycidyl (meth)acrylate, vinylbenzyl glycidyl ether, allyl glycidyl ether, (3,4-epoxycyclohexyl) methyl (meth)acrylate, and vinylcyclohexene oxide.

Examples of the dendrimers (hyperbranched polymers) include SIRIUS-501 and SUBARU-501 (both available from Osaka Organic Chemical Industry Ltd.).

The weight average molecular weight of the oligomer can be appropriately designed depending on the purpose and application of the active energy ray-curable resin composition of the present invention, and is usually preferably 400 to 100000. From the viewpoint of achievement of both good properties of a cured product and handling, the weight average molecular weight is more preferably 450 or more, still more preferably 500 or more, while it is more preferably 70000 or less, still more preferably 50000 or less. The weight average molecular weight is a value obtainable by gel permeation chromatography (GPC), as measured by the method described in the EXAMPLES.

The curable resin composition of the present invention may contain one or more of the oligomers.

The amount of the oligomer(s) in the curable resin composition of the present invention may be appropriately designed depending on the purpose and application of the curable resin composition. The amount thereof is usually preferably 0.05 to 99% by mass, more preferably 0.1% by mass or more, still more preferably 0.5% by mass or more, while it is more preferably 95% by mass or less, still more preferably 90% by mass or less, based on 100% by mass of solids content of the curable resin composition.

When the curable resin composition of the present invention is used as a 3D modeling resin composition, the amount of the oligomer(s) is preferably 20 to 80% by mass, more preferably 20 to 70% by mass, still more preferably 30 to 70% by mass, based on 100% by mass of solids content of the curable resin composition.

In the curable resin composition of the present invention, preferably, the crosslinkable compound (A) and the oligomer (B) are present in a content ratio [(A)/(B)] by mass of 1/100 to 100/1. With the content ratio within the range indicated above, low viscosity and properties of a cured product, such as hardness, thermal degradation resistance, toughness, adhesiveness, and weather resistance, can be better balanced.

The content ratio by mass is more preferably 2/100 or more, still more preferably 3/100 or more, while it is more preferably 50/1 or less, still more preferably 20/1 or less.

When the curable resin composition is used as a 3D modeling resin composition, the content ratio [(A)/(B)] by mass is preferably 5/80 to 50/30, more preferably 10/70 to 35/30.

(C) Polymerization Initiator

The active energy ray-curable resin composition of the present invention further contains a polymerization initiator. The active energy ray-curable resin composition of the present invention can be cured by radical polymerization initiated by heating and/or application of active energy rays such as electromagnetic waves or electron beams. Use of a radical polymerization initiator enables more effective curing.

Examples of the radical polymerization initiator include thermal radical initiators which generate radicals by heating, and photoradical initiators which generate radicals by application of active energy rays. One or more of these can be used.

Also, one or more of commonly used additives including radical polymerization accelerators and photosensitizers may be added as needed.

Examples of the thermal radical initiators include known organic peroxide initiators and known azo initiators. The following describes specific examples thereof.

Organic peroxide initiators such as methyl ethyl ketone peroxide, cyclohexanone peroxide, methylcyclohexanone peroxide, methyl acetoacetate peroxide, acetylacetone peroxide, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)-2-methylcyclohexane, 1,1-bis(t-butylperoxy)cyclohexane, 1,1-bis(t-butylperoxy)cyclododecane, 1,1-bis(t-butylperoxy) butane, 2,2-bis(4,4-di-t-butylperoxy cyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropyl benzene, dicumyl peroxide, 2,5-dimethyl-2,5-bis(t-butylperoxy)hexane, t-butyl cumyl peroxide, di-t-butyl peroxide, 2,5-dimethyl-2, 5-bis(t-butylperoxy)hexyne-3, isobutyryl peroxide, 3,5,5-trimethylhexanoyl peroxide, octanoyl peroxide, lauroyl peroxide, stearoyl peroxide, succinic acid peroxide, m-toluoyl benzoyl peroxide, benzoyl peroxide, di-n-propylperoxydicarbonate, diisopropylperoxydicarbonate, bis(4-t-butylcyclohexyl)peroxydicarbonate, di-2-ethoxyethylperoxydicarbonate, di-2-ethoxyhexylperoxydicarbonate, di-3-methoxybutylperoxydicarbonate, di-s-butylperoxydicarbonate, di(3-methyl-3-methoxybutyl) peroxydicarbonate, α,α'-bis(neodecanoylperoxy) diisopropyl benzene, cumylperoxyneodecanoate, 1,1,3,3,-tetramethyl butylperoxyneodecanoate, 1-cyclohexyl-1-methylethylperoxyneodecanoate, t-hexylperoxyneodecanoate, t-butylperoxyneodecanoate, t-hexylperoxypivalate, t-butyl peroxypivalate, 1,1,3,3-tetramethylbutylperoxy-2-ethylhexanoate, 2,5-dimethyl-2,5-bis(2-ethylhexanoylperoxy)hexanoate, 1-cyclohexyl-1-methylethylperoxy-2-ethylhexanoate, t-hexylperoxy-2-ethylhexanoate, t-butylperoxy-2-ethylhexanoate, t-hexylperoxyisopropyl monocarbonate, t-butyl peroxyisobutyrate, t-butylperoxymalate, t-butylperoxy-3,5,5-trimethylhexanoate, t-butylperoxylaurate, t-butylperoxyisopropyl monocarbonate, t-butylperoxy-2-ethylhexyl monocarbonate, t-butylperoxyacetate, t-butylperoxy-m-tolyl benzoate, t-butylperoxybenzoate, bis(t-butylperoxy)isophthalate, 2,5-dimethyl-2,5-bis(m-tolylperoxy)hexane, t-hexylperoxybenzoate, 2,5-dimethyl-2,5-bis(benzoylperoxy) hexane, t-butylperoxyallyl monocarbonate, t-butyltrimethylsilyl peroxide, 3,3',4,4'-tetra(t-butylperoxycarbonyl)benzophenone, and 2,3-dimethyl-2,3-diphenylbutane.

Azo initiators such as 2-phenylazo-4-methoxy-2,4-dimethylvaleronitrile, 1-[(1-cyano-1-methylethyl)azo]formamide, 1,1'-azobis(cyclohexane-1-carbonitrile), 2,2'-azobis (2-methylbutyronitrile), 2,2'-azobis isobutyronitrile, 2,2'-azobis(2,4-dimethylvaleronitrile), 2,2'-azobis(2,4-dimethyl-4-methoxyvaleronitrile), 2,2'-azobis(2-methylpropionamidine) dihydrochloride, 2,2'-azobis(2-methyl-N-phenylpropionamidine) dihydrochloride, 2,2'-azobis[N-(4-chlorophenyl)-2-methylpropionamidine] dihydrochloride, 2,2'-azobis[N-(4-hydroxyphenyl)-2-methylpropionamidine] dihydrochloride, 2,2'-azobis[2-methyl-N-(phenylmethyl) propionamidine] dihydrochloride, 2,2'-azobis[2-methyl-N-(2-propenyl)propionamidine] dihydrochloride, 2,2'-azobis[N-(2-hydroxyethyl)-2-methylpropionamidine] dihydrochloride, 2,2'-azobis[2-(5-methyl-2-imidazolin-2-yl)propane] dihydrochloride, 2,2'-azobis[2-(2-imidazolin-2-yl)propane] dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane] dihydrochloride, 2,2'-azobis[2-(5-hydroxy-3,4,5,6-tetrahydropyrimidin-2-yl)propane] dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis (hydroxymethyl)-2-hydroxyethyl]propionamide}, 2,2'-azobis{2-methyl-N-[1,1-bis(hydroxymethyl)ethyl] propionamide}, 2,2'-azobis[2-methyl-N-(2-hydroxyethyl) propionamide], 2,2'-azobis(2-methylpropionamide), 2,2'-azobis(2,4,4-trimethylpentane), 2,2'-azobis(2- methylpropane), dimethyl-2,2-azobis(2-methylpropionate), 4,4'-azobis(4-cyanopentanoic acid), and 2,2'-azobis[2-(hydroxymethyl)propionitrile].

The radical polymerization accelerators usable with the thermal radical initiators are not limited as long as they are commonly used accelerators which promote degradation of the thermal radical initiators (generation of initiating radicals). The radical polymerization accelerators usable may be commonly used accelerators. Examples thereof include organic salts, inorganic salts, oxides, and metal complexes of metals; amine compounds; quaternary ammonium salts; thiourea compounds; and ketone compounds. Specific examples of the radical polymerization accelerators include those described in JP 5689628 B (paragraph [0089]).

Preferred examples of the photoradical initiators include alkylphenone compounds, benzophenone compounds, benzoin compounds, thioxanthone compounds, halomethylated triazine compounds, halomethylated oxadiazole compounds, biimidazole compounds, oxime ester compounds, titanocene compounds, benzoic acid ester compounds, acridine compounds, anthraquinone compounds, ketal compounds, and phosphine oxide compounds. The following describes specific examples thereof: alkylphenone compounds such as 2,2-diethoxy acetophenone, 2,2-dimethoxy-2-phenylacetophenone, 1-hydroxycyclohexylphenyl ketone, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2-methyl-1-(4-methylthiophenyl)-2-morpholinopropan-1-one, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone; benzophenone compounds such as benzophenone, 4,4'-bis(dimethylamino)benzophenone and 2-carboxybenzophenone; benzoin compounds such as benzoin, benzoin methyl ether, benzoin ethyl ether, benzoin isopropyl ether, and benzoin isobutyl ether; thioxanthone; thioxanthone compounds such as 2-ethylthioxanthone, 2-isopropylthioxanthone, 2-chlorothioxanthone, 2,4-dimethyl thioxanthone, and 2,4-diethyl thioxanthone; and halomethylated triazine compounds such as 2-(4-methoxyphenyl)-4,6-bis(trichloromethyl)-s-triazine, 2-(4-methoxynaphthyl)-4,6-bis(trichloromethyl)-s-triazine, 2-(4-ethoxynaphthyl)-4,6-bis(trichloromethyl)-s-triazine, and 2-(4-ethoxycarbonylnaphthyl)-4,6-bis(trichloromethyl)-s-triazine.

Halomethylated oxadiazole compounds such as 2-trichloromethyl-5-(2'-benzofuryl)-1,3,4-oxadiazole, 2-trichloromethyl-5-[β-(2'-benzofuryl)vinyl]-1,3,4-oxadiazole, 4-oxadiazole, and 2-trichloromethyl-5-furyl-1,3,4-oxadiazole; biimidazole compounds such as 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, and 2,2'-bis(2,4,6-trichlorophenyl)-4,4',5,5'-tetraphenyl-1,2'-biimidazole; oxime ester compounds such as 1,2-octanedion, 1-[4-(phenylthio)-,2-(O-benzoyloxime)], ethanone, 1-[9-ethyl-6-(2-methylbenzoyl)-9H-carbazol-3-yl]-, 1-(O-acetyloxime); titanocene compounds such as bis(η5-2,4-cyclopentadien-1-yl)-bis(2,6-difluoro-3-(1H-pyrrol-1-yl)-phenyl)titanium; benzoic acid ester compounds such as p-dimethylamino benzoic acid and p-diethylamino benzoic acid; and acridine compounds such as 9-phenylacridine.

Anthraquinone compounds such as 2-ethylanthraquinone, 2-t-butylanthraquinone, 2-chloroanthraquinone, and 2-amylanthraquinone; ketal compounds such as acetophenodimethyl ketal and benzyl dimethyl ketal; and phosphine oxide compounds such as diphenyl(2,4,6-trimethylbenzoyl) phosphine oxide, phenylbis(2,4,6-trimethylbenzoyl) phosphine oxide, and bis-(2,6-dimethoxybenzoyl)-2,4,4-trimethylpentylphosphine oxide.

A photosensitizer and a radical polymerization accelerator may be used together with the photoradical initiator. The photosensitizer and the radical polymerization accelerator may be, but not limited to, commonly used photosensitizer and radical polymerization accelerator, respectively. Specific examples of the photosensitizer and the radical polymerization accelerator to be used with the photoradical initiator include those described in JP 5689628 B (paragraph [0092]).

The curable resin composition of the present invention may contain one or more of the polymerization initiators.

The amount of the polymerization initiator(s) is not limited and can be appropriately designed depending on the purpose and application. The amount thereof is usually preferably 0.01 to 10% by mass, more preferably 0.05% by mass or more, still more preferably 0.1% by mass or more, while it is more preferably 7% by mass or less, still more preferably 5% by mass or less, based on 100% by mass of solids content of the curable resin composition.

The total amount of the radical polymerization accelerator and photosensitizer added is not limited and can be appropriately designed depending on the purpose and application. The total amount thereof is usually preferably 0 to 8% by mass, more preferably 0 to 7% by mass, still more preferably 0 to 5% by mass, based on 100% by mass of solids content of the curable resin composition.

(D) Compound D

The active energy ray-curable resin composition of the present invention preferably further contains a compound represented by the following formula (3) (hereinafter referred to as "compound D"). The presence of the compound can better achieve both good properties of a cured product and handling.

[Chem. 20]

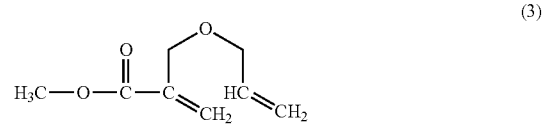

(3)

When the curable resin composition of the present invention contains the compound D, the amount of the compound D is preferably 0.1 to 50% by mass, more preferably 0.1 to 40% by mass, still more preferably 0.1 to 30% by mass, based on 100% by mass of solids content of the curable resin composition.

(E) Different Additives

The active energy ray-curable resin composition of the present invention may further contain different additives depending on the purpose and application of the curable resin composition. Examples of the different additives include solvents, reactive diluents, dryers and other curing accelerators, stabilizers, colorants, dispersants, fillers, adhesion improvers, mold release agents, plasticizers, UV absorbers, matting agents, antifoaming agents, leveling agents, antistatic agents, slip agents, surface modifiers, coupling agents, and acid generators. The different additives are not limited thereto, and may be appropriately selected from known additives depending on the purpose and application. Specifically, additives described in JP 5689628 B (paragraphs [0095] to [0111]) can be suitably used. The amount of any of these additives can be appropriately set based on the known art. Of the above-listed additives, the active energy ray-curable resin composition preferably contains a reactive diluent.

(Reactive Diluent)

The reactive diluent is a low-molecular compound containing a polymerizable group that can be polymerized by heating or application of active energy rays or the like. Particularly, a reactive diluent which is liquid and has low viscosity at room temperature has viscosity control function and thus can be used instead of a solvent and is preferably used for solvent-free applications. Commonly used examples of the reactive diluent include compounds containing a radically polymerizable group such as a group containing a carbon-carbon unsaturated bond; compounds containing a cationically polymerizable group such as an epoxy group, an oxetanyl group, or a vinyl ether group; and compounds containing a radically polymerizable group and a cationically polymerizable group. When the curable resin composition of the present invention contains a reactive diluent, the reactive diluent may be a commonly used reactive diluent. The curable resin composition of the present invention may contain one or more reactive diluents appropriately selected depending on the purpose and application. The reactive diluent is not limited. Since the curable resin composition of the present invention contains a radically polymerizable crosslinkable compound, the reactive diluent preferably contains a radically polymerizable group which can be cured by the same mechanism as that for curing the crosslinkable compound. Thereby, synergistic effects are easily obtained. Examples of the radically polymerizable reactive diluent include monofunctional radically polymerizable monomers containing one radically polymerizable unsaturated group in a molecule and polyfunctional radically polymerizable monomers containing two or more radically polymerizable unsaturated groups in a molecule.

When the curable resin composition of the present invention is used as a 3D modeling resin composition, the reactive diluent is preferably a compound containing a radically polymerizable group, a compound containing a cationically polymerizable group, or a combination thereof. A preferred example of the compound containing a cationically polymerizable group is 3-ethyl-3-hydroxymethyloxetane.

Examples of the monofunctional radically polymerizable monomers include (meth)acrylic acid esters, (meth)acrylamides, unsaturated polyvalent monocarboxylic acids, unsaturated monocarboxylic acids, unsaturated acid anhydrides, aromatic vinyl compounds, N-substituted maleimides, conjugated dienes, vinyl esters, vinyl ethers, N-vinyl compounds, and unsaturated isocyanates. Specific examples thereof include monofunctional radically polymerizable monomers described in JP 5689628 B (paragraphs [0104] and [0105]).

Examples of the polyfunctional radically polymerizable monomers include polyfunctional (meth)acrylates, polyfunctional vinyl ethers, vinyl ether group-containing (meth)acrylic acid esters, polyfunctional allyl ethers, and allyl group-containing (meth)acrylic acid esters, polyfunctional (meth)acryloyl group-containing isocyanurates, polyfunctional allyl group-containing isocyanurates, polyfunctional allyl group-containing isocyanurates, polyfunctional urethane (meth)acrylates, and polyfunctional aromatics vinyls. Specific examples thereof include monofunctional radically polymerizable monomers described in JP 5689628 B (paragraphs [0106] to [0108]).

When the curable resin composition of the present invention contains the reactive diluent(s), the amount of the reactive diluent(s) is not limited and may be appropriately set depending on the purpose and application. The amount thereof is preferably 0 to 1500% by mass, more preferably 0 to 1000% by mass, still more preferably 0 to 800% by mass, per 100% by mass of the crosslinkable compound.

(Stabilizer)

The stabilizer is not limited as long as it is a compound that reacts with radicals generated from a photoradical polymerization initiator or the like to prevent polymerization. Examples thereof include quinone stabilizers, piperidine stabilizers, phenolic stabilizers, phosphorus stabilizers, and nitroso stabilizers. Preferred among these stabilizers are hydroquinone stabilizers, semi-hindered phenolic stabilizers, (thio)phosphite stabilizers, phosphine stabilizers, thioether stabilizers, nitroso stabilizers, and piperazine stabilizers, with semi-hindered phenolic stabilizers, (thio)phosphite stabilizers, and thioether stabilizers being more preferred. Specifically, the stabilizer may be suitably any of those described in JP 6125933 B (paragraphs [0021] to [0051]). These stabilizers may be used alone or in combination of two or more.

The amount of the stabilizer(s) is preferably 0.0001 to 5% by mass, more preferably 0.001 to 3% by mass, still more preferably 0.01 to 2% by mass, based on 100% by mass of solids content of the curable resin composition.

The curable resin composition of the present invention can retain low viscosity even when containing a high viscosity oligomer owing to the relatively low viscosity of the crosslinkable compound. Thus, the curable resin composition can have a variety of formulations and can have various properties required for different applications.

The viscosity of the curable resin composition of the present invention is not limited and can be appropriately set depending on the purpose and application. The viscosity is preferably 10 to 10000 mPa·s, more preferably 10 to 5000 mPa·s, still more preferably 10 to 2000 mPa·s, particularly preferably 10 to 1500 mPa·s.

The viscosity is a value measured at 25° C. using a viscometer such as a cone-plate viscometer (TV-20L available from Toki Sangyo Co., Ltd.).

(Method of Producing Active Energy Ray-Curable Resin Composition)

The active energy ray-curable resin composition of the present invention may be produced by any method and can be produced by mixing the crosslinkable compound (A), the oligomer (B), and the polymerization initiator (C) described above, optionally any of the different additives described above, and the like using a paint shaker, bead mill, kneader, mixer, or another known apparatus.

(Method of Curing Curable Resin Composition)

The active energy ray-curable resin composition of the present invention may be cured by any method. The method may be appropriately selected from known methods such as heating, application of active energy rays, and exposure to an oxygen-containing atmosphere, depending on the purpose and application of the curable resin composition. These methods may be used alone or in combination of two or more. Preferred among these is application of active energy rays.

In the case of curing by heating, the curing temperature may be appropriately set according to the formulation of the curable resin composition. For example, when no curing accelerator is used, the temperature is preferably 30° C. to 400° C., more preferably 70° C. to 350° C., still more preferably 100° C. to 350° C. from the viewpoint of facilitation of curing and reduction of thermal degradation. When a curing accelerator is used, the curable resin composition can be cured at lower temperature than when no curing accelerator is used. The temperature is preferably 0° C. to 400° C., more preferably 10° C. to 350° C., still more preferably 20° C. to 350° C.

The curing by heating may be carried out in one stage or in two or more stages, and may be carried out before or after curing by application of active energy rays and/or exposure to an oxygen-containing atmosphere. For example, the curable resin composition is first crosslinked to some extent by heating at low temperature or by application of active energy rays for a short time, and is then subjected to treatment such as development. Thereafter, the curable resin composition is cured at higher temperature, preferably 150° C. or higher, more preferably 180° C. or higher, still more preferably 200° C. or higher. This process is called a post-bake process or a post-cure process, which can further facilitate the crosslinking reaction.

The active energy rays used in a curing method by application of active energy rays may be commonly used rays. Examples thereof include electromagnetic waves such as gamma rays, X-rays, ultraviolet rays, visible rays, and infrared rays; and corpuscular beams such as electron beams, neutron beams, and proton beams. Of these, gamma rays, X-rays, extreme ultraviolet rays, ultraviolet rays, visible rays, and electron beams are preferred, extreme ultraviolet rays, ultraviolet rays, visible rays, and electron beams are more preferred, and ultraviolet rays are most preferred, from the viewpoint of factors such as the intensity of the energy and an energy ray generator. When no curing accelerator is used, active energy rays such as gamma rays, X-rays, and electron beams, which have a high energy, are preferably used. When a curing accelerator is used, active energy rays such as ultraviolet rays and visible rays, which have a relatively low energy but can be easily and economically generated, are preferably used.

A curing method by exposure to an oxygen-containing atmosphere is a method of curing the curable resin composition by exposing the curable resin composition to an oxygen-containing atmosphere. The oxygen concentration in the oxygen-containing atmosphere is preferably 5% by volume or more, more preferably 10% by volume or more, most preferably 18% by volume or more. In other words, the oxygen concentration in the oxygen-containing atmosphere is most preferably equal to or higher than the oxygen concentration in the air. The curing method by exposing to an oxygen-containing atmosphere may be used in combination with the curing method by heating and/or the curing method by application of active energy rays. In particular, the curing method by heating and/or the curing method by application of active energy rays in the air are preferred because they are preferred for combination use.

2. Cured Product

As mentioned above, the active energy ray-curable resin composition of the present invention can retain relatively low viscosity even when containing a high viscosity component. Thus, the curable resin composition can be produced in a wider range of design than conventional curable resin compositions, and a cured product obtainable by curing the curable resin composition can have desired properties. The present invention encompasses the cured product of the active energy ray-curable resin composition.

When the cured product is a cured film, the cured film has a thickness, which can be appropriately set depending on the purpose and application, of, for example, 0.1 to 5000 μm, preferably 0.5 to 1000 μm, still more preferably 1 to 300 μm.

The cured product can have various properties according to the formulation of the active energy ray-curable resin composition. For example, the cured product can have required excellent physical properties such as thermal degradation resistance, hardness, adhesion to substrates, toughness, and weather resistance.

3. Applications

The active energy ray-curable resin composition of the present invention containing the crosslinkable compound is very excellent in curability. In addition, the active energy ray-curable resin composition can be prepared to have relatively low viscosity even when containing a high viscosity oligomer, and can provide a cured product having properties required depending on the application, such as thermal degradation resistance, adhesion to substrates, hardness, toughness, and weather resistance.

The active energy ray-curable resin composition of the present invention and a cured product thereof can be suitably used for a wide variety of applications such as adhesives, cohesive agents, biomaterials, dental materials, optical materials, information recording materials, optical fiber materials, color filter resist, solder resist, plating resist, black resist, semiconductor photoresist, TFT formation resist, EUV resist, KrF resist, ArF resist, g-line resist, i-line resist, 3D modeling materials (preferably, 3D printing resins), UV-curable inkjet inks, photospacers/black columns, automotive UV-curable coatings/coating materials, coating materials for optical fibers, hard coating materials for films, UV-curable coatings/coating materials for electrical appliances, buffer coats, rewiring materials, back grinding tape, dicing tape, UV-curable coatings, insulators, sealants, inkjet inks, printing inks, coatings, casting materials, UV-curable coating agents, decorative plates, WPC, covering materials, photosensitive printing plates, OCA/OCR for touch panels, coverlay films, dry films, dry film resist, lining materials, civil engineering and construction materials, putty, repair materials, flooring materials, pavement material gel coats, overcoats, molding materials for hand lay-up, spray-up, pultrusion molding, filament winding, SMC, or BMC, polymer solid electrolytes, lens molding resins, and microlens molding resins.

From the viewpoint of higher performance and ease of achievement of the properties in a trade-off relationship at the same time, preferred among these are adhesives, cohesive agents, 3D modeling materials, UV-curable inkjet inks, sealants, and UV-curable coating agents.

When the active energy ray-curable resin composition of the present invention is used as a 3D modeling material, any 3D printer system may be used, and the 3D printer system may be any system capable of using the curable resin composition as a light-curable material, such as a liquid bath photopolymerization method (e.g., LASER, DLP) or a material injection method (Ink-Jet).

As described above, the active energy ray-curable resin composition of the present invention and a cured product thereof can retain low viscosity and have a desired formulation, and can suitably provide the properties required in various technical fields and applications.

EXAMPLES

The following describes the details of the present invention with reference to the examples. The present invention is, however, not limited to these examples. It should be noted that the terms "part(s)" and "%" refer to "part(s) by mass" and "% by mass", respectively, unless otherwise stated.

In the EXAMPLES, the properties were measured by the following methods.

<Viscosity>

The viscosity of the curable resin composition was measured at 25° C. using a cone-plate viscometer (TV-20L available from Toki Sangyo Co., Ltd.).

<Thermal Degradation Temperature>

The thermal degradation temperature of a cured product of the curable resin composition was measured using a thermogravimetric differential thermal analyzer (TG-DTA2010SA available from Bruker) under the following conditions.

Measuring temperature range: room temperature to 500° C.
Temperature increase rate: 10° C./min
Atmosphere and flow rate: Nitrogen, 50 ml/min <Glass Transition Temperature (Tg)>

The glass transition temperature (Tg) of a cured product of the curable resin composition was measured in accordance with JIS K 7121 using the following differential scanning calorimeter under the following conditions and determined by the midpoint method.

Apparatus: DSC3500 (NETZSCH Japan)
Temperature increase rate: 10° C./min
Atmosphere and flow rate: Nitrogen, 50 ml/min <Tensile Strength, Strain at Break, Tensile Modulus>

(1) Preparation of Test Specimen

An article was prepared by stereolithography in conformity with JIS K 7161-2 1BA (t2 mm) using the curable resin composition with a Noble 1.0 (XYZprinting) such that a cured resin layer had a thickness of 100 μm, under laser irradiation conditions of standard resin (clear). Next, a resin composition attached to the outer surface of the resulting stereolithography article was washed off with 2-propanol. The washed stereolithography article was secondly cured using MultiCure 180 (XYZPrinting) under standard resin irradiation conditions (wavelength (nm): 365+385+405, power level (%): 100, curing time (min): 7, rotation: on), and was formed into a test specimen.

(2) Measurement

The test specimen obtained in (1) was subjected to measurement of tensile strength, strain at break, and tensile modulus according to JIS K 7161-2 using a shimadzu autograph (AGS-X Series available from Shimadzu Corporation) under the following test conditions.

Test specimen: JIS K 7161-2 1BA type (t2 mm)
Test temperature: 23° C.
Test speed: 1 mm/min
Distance between chucks: 58 mm
Number of measurements: n=7

(Production Example 1) Production of Crosslinkable Compound (TPG-AOMA)

In a separable flask, a stirrer bar, 2.27 g (8 mmol) of titanium tetraisopropoxide (TTIP), 38.5 g (200 mmol) of tripropylene glycol (TPG), 124.9 g (800 mmol) of methyl α-allyloxymethyl acrylate (AOMA), 120 mg (1000 ppm relative to AOMA) of a polymerization inhibitor (6-t-butyl-2,4-xylenol available from Tokyo Chemical Industry Co., Ltd.), 60 mg (500 ppm relative to AOMA) of a polymerization inhibitor (Polystop 7300P available from Hakuto Co., Ltd.), and 60.0 g of an azeotrope toluene were weighed. The temperature was increased to 100° C. while gas mixture ($N_2/O_2$=92/8 (v/v)) bubbling was performed and the pressure in the system was reduced to 300 Torr. The distilled fraction was appropriately removed. The contents were reacted while the same amount of toluene as the distilled fraction was added to the system and heated until the conversion of triethylene glycol satisfied >99%.

After the reaction, the system was depressurized with gas mixture ($N_2/O_2$=92/8 (v/v)) bubbling to remove toluene and residual AOMA. Thereafter, target fractions were separated with a medium-pressure preparative liquid chromatography system (YFLC AI-580 available from Yamazen Corporation). To the target fractions were added a polymerization inhibitor (6-t-butyl-2,4-xylenol available from Tokyo Chemical Industry Co., Ltd.) in an amount of 300 ppm relative to a sample to be obtained and a polymerization inhibitor (triphenyl phosphite available from ADEKA) in an amount of 500 ppm relative to the sample to be obtained. The solvent was distilled off to isolate a target sample TPG-AOMA.

(Production Example 2) Production of Crosslinkable Compound (DPG-AOMA)

A crosslinkable compound (DPG-AOMA) was obtained by the same method as in Production Example 1 except that dipropylene glycol (DPG) was used instead of tripropylene glycol.

(Production Example 3) Production of Crosslinkable Compound (TPG-AOMA)

In a separable flask with a stirring blade, 432.5 g (2.2 mol) of tripropylene glycol (TPG), 2319.3 g (14.8 mol) of methyl α-allyloxymethyl acrylate (AOMA), 2.3 g (1000 ppm relative to AOMA) of a polymerization inhibitor (6-t-butyl-2,4-xylenol available from Tokyo Chemical Industry Co., Ltd.), 1.2 g (500 ppm relative to AOMA) of a polymerization inhibitor (Polystop 7300P available from Hakuto Co., Ltd.), 202.9 g of an azeotrope heptane, and 25.6 g (90 mmol) of titanium tetraisopropoxide (TTIP) were weighed. The temperature was increased to 100° C. while gas mixture ($N_2/O_2$=92/8 (v/v)) bubbling was performed and the pressure in the system was reduced to 300 Torr. The fraction was appropriately removed. The contents were reacted while the same amount of heptane as the removed fraction was added to the system and heated until the conversion of triethylene glycol satisfied >98%.

After the reaction, 590 g of a 5% aqueous oxalic acid solution was added and the reaction solution was washed therewith. The reaction solution was further washed twice with 590 g of pure water. After washing, under gas mixture ($N_2/O_2$=92/8 (v/v)) bubbling, low boiling point components were distilled off under reduced pressure until the temperature of the bottom liquid reached 115° C. (5 Torr). Thus, TPG-AOMA containing 2% AOMA was obtained.

Examples 1 to 6 and Comparative Examples 1 to 3

Curable resin compositions of Examples 1 to 6 were prepared by mixing crosslinkable compounds, oligomers, and polymerization initiators according to the formulation shown in Table 1. The resulting curable resin compositions were subjected to evaluation of viscosity. The results are shown in Table 1.

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| (A) Crosslinkable compound (parts) | TPG-AOMA | 10 | 11 | 10 | — | — | — | — | — | — |
|  | DPG-AOMA | — | — | — | 10 | 11 | 10 | — | — | — |
| (B) Oligomer (parts) | Polyester acrylate | 3 | — | — | 3 | — | — | 13 | — | — |
|  | Urethane acrylate | — | 2 | — | — | 2 | — | — | 13 | — |
|  | Epoxy acrylate | — | — | 3 | — | — | 3 | — | — | 13 |
| (C) Polymerization initiator (parts) |  | 0.39 | 0.39 | 0.39 | 0.39 | 0.39 | 0.39 | — | — | — |
| Viscosity (mPa·s) |  | 56.4 | 33.1 | 34.2 | 26.1 | 20.8 | 32.3 | 25000 | 1770 (60° C.) | 1174 |

The following describes the crosslinkable compounds, oligomers, and polymerization initiators shown in Table 1. The amounts of the components in Table 1 are in terms of solids content.

TPG-AOMA: crosslinkable compound of Production Example 1
DPG-AOMA: crosslinkable compound of Production Example 2 Polyester acrylate: EBECRYL 884, viscosity (25° C.): 25000 mPa·s, available from DAICEL-ALLNEX LTD.
Urethane acrylate: CN964, viscosity (60° C.): 1770 mPa·s, available from Sartomer
Epoxy acrylate: Epoxy ester 70PA, viscosity (25° C.): 1174 mPa·s, available from Kyoeisha Chemical Co., Ltd.
Polymerization initiator: Omnirad 184 available from IGM Resins Table 1 revealed that the curable resin compositions each containing a crosslinkable compound having an AMA group, an oligomer, and a polymerization initiator have much lower viscosity than the curable resin compositions each containing only a high viscosity component oligomer.

Comparative Examples 4 to 9

Curable resin compositions of Comparative Examples 4 to 9 were prepared by mixing oligomers, polymerization initiators, and reactive diluents according to the formulation shown in Table 2.

The curable resin compositions of Examples 1 to 6 and Comparative Examples 4 to 9 were placed in respective aluminum pans and irradiated with UV light under the conditions described below to obtain evaluation samples of the cured products. The thermal degradation temperature and glass transition temperature (Tg) of the evaluation samples were measured. The results are shown in Table 2.
UV irradiation apparatus: HCT400B-28HB (SEN LIGHTS Corporation) Cumulative light dose: 15 J/cm$^2$

TABLE 2

|  |  | Example 1 | Example 2 | Example 3 | Example 4 | Example 5 | Example 6 | Comparative Example 4 |
|---|---|---|---|---|---|---|---|---|
| (A) Crosslinkable compound (parts) | TPG-AOMA | 10 | 11 | 10 | — | — | — | — |
|  | DPG-AOMA | — | — | — | 10 | 11 | 10 | — |
| (B) Oligomer (parts) | Polyester acrylate | 3 | — | — | 3 | — | — | 3 |
|  | Urethane acrylate | — | 2 | — | — | 2 | — | — |
|  | Epoxy acrylate | — | — | 3 | — | — | 3 | — |
| (C) Polymerization initiator (parts) |  | 0.39 | 0.39 | 0.39 | 0.39 | 0.39 | 0.39 | 0.39 |
| Reactive diluent (parts) | TPG-A | — | — | — | — | — | — | 10 |
|  | PEA | — | — | — | — | — | — | — |
| Thermal degradation temperature (° C.) |  | 338 | 335 | 311 | 331 | 334 | 315 | 312 |
| Glass transition temperature (° C.) |  | 88 | 96 | 75 | 148 | 182 | 145 | 62 |

|  |  | Comparative Example 5 | Comparative Example 6 | Comparative Example 7 | Comparative Example 8 | Comparative Example 9 |
|---|---|---|---|---|---|---|
| (A) Crosslinkable compound (parts) | TPG-AOMA | — | — | — | — | — |
|  | DPG-AOMA | — | — | — | — | — |
| (B) Oligomer (parts) | Polyester acrylate | — | — | 3 | — | — |
|  | Urethane acrylate | 2 | — | — | 2 | — |
|  | Epoxy acrylate | — | 3 | — | — | 3 |
| (C) Polymerization initiator (parts) |  | 0.39 | 0.39 | 0.39 | 0.39 | 0.39 |
| Reactive diluent (parts) | TPG-A | 11 | 10 | — | — | — |
|  | PEA | — | — | 10 | 11 | 10 |
| Thermal degradation temperature (° C.) |  | 323 | 303 | 259 | 247 | 172 |
| Glass transition temperature (° C.) |  | 63 | 53 | −2 | −1 | −2 |

The following describes the oligomers, polymerization initiators, and reactive diluents shown in Table 2. The amounts of the components in Table 2 are in terms of solids content.

Polyester acrylate: EBECRYL 884, viscosity (25° C.): 25000 mPa·s, available from DAICEL-ALLNEX LTD.

Urethane acrylate: CN964, viscosity (60° C.): 1770 mPa·s, available from Sartomer Epoxy acrylate: Epoxy ester 70PA, viscosity (25° C.): 1174 mPa·s, available from Kyoeisha Chemical Co., Ltd.

Polymerization initiator: Omnirad 184 available from IGM Resins

TPG-A: tripropylene glycol diacrylate, APG-200, available from Shin-Nakamura Chemical Co., Ltd.

PEA: Phenoxyethyl acrylate

Table 2 revealed that the curable resin compositions each containing a crosslinkable compound having an AMA group, an oligomer, and a polymerization initiator provide cured products having better thermal degradation resistance and heat resistance than the curable resin compositions each containing a reactive diluent having two or more acryloyl groups, an oligomer, and a polymerization initiator and the curable resin compositions free from crosslinkable compounds.

Example 7 and Comparison Example 10

Curable resin compositions of Example 7 and Comparative Example 10 were prepared by mixing crosslinkable compounds, oligomers, polymerization initiators, and reactive diluents according to the formulation shown in Table 3. The resulting curable resin compositions were subjected to measurements of viscosity, tensile strength, strain at break, and tensile modulus by the methods described above. The results are shown in Table 3.

TABLE 3

|  |  | Example 7 | Comparative Example 10 |
|---|---|---|---|
| (A) Crosslinkable compound (parts) | TPG-AOMA | 25 | — |
|  | TPG-A | — | 25 |
| (B) Oligomer (parts) | Urethane acrylate | 50 | 50 |
| (C) Polymerization initiator (parts) | TPO | 1 | 1 |
| Reactive diluent (parts) | IBOA | 25 | 25 |
| Viscosity (mPa · s) |  | 524 | 372 |
| Tensile strength (MPa) |  | 41.1 | 36.3 |
| Strain at break (%) |  | 2.4 | 2.2 |
| Tensile modulus (MPa) |  | 1955 | 1608 |

The following describes the crosslinkable compounds, oligomers, polymerization initiators, and reactive diluents shown in Table 3. The amounts of the components in Table 3 are in terms of solids content.

TPG-AOMA: crosslinkable compound of Production Example 3

TPG-A: tripropylene glycol diacrylate available from Tokyo Kasei Kogyo Co.

Urethane acrylate: SHIKOH® UV-7650B, viscosity (60° C.): 5500 mPa·s, available from Mitsubishi Chemical Corporation TPO: diphenyl (2,4,6-trimethylbenzoyl) phosphine oxide IBOA: isobornyl acrylate Table 3 revealed that the curable resin compositions each containing a crosslinkable compound having an AMA group, an oligomer, and a polymerization initiator have higher tensile strength, strain at break, and tensile modulus and better toughness than the curable resin compositions each containing an oligomer, a polymerization initiator, and a crosslinkable compound free from AMA groups. The viscosities of the curable resin compositions each containing a crosslinkable compound having an AMA group, an oligomer, and a polymerization initiator are slightly high but yet considered relatively low aw they are not higher than 600 mPa·s. Thus, these curable resin compositions are easy to handle.

The invention claimed is:

1. An active energy ray-curable resin composition comprising:
   a crosslinkable compound (A);
   an oligomer (B) having a viscosity at 25° C. of 1000 mPa·s or higher or a viscosity at 60° C. of 400 mPa·s or higher; and
   a polymerization initiator (C),
   the crosslinkable compound (A) being represented by the following formula (1):

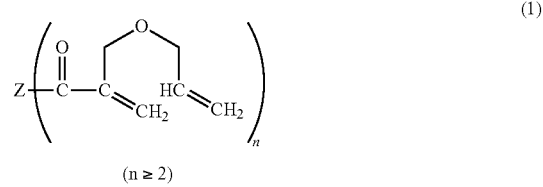

(n ≥ 2)

wherein Z is an n-valent linking group, with n being an integer of 2 or greater.

2. The active energy ray-curable resin composition according to claim 1,
   wherein the oligomer (B) has a viscosity at 25° C. of 1000 mPa·s or higher and a viscosity at 60° C. of 400 mPa·s or higher.

3. The active energy ray-curable resin composition according to claim 1,
   wherein the oligomer (B) includes at least one selected from the group consisting of polyester (meth)acrylates, epoxy (meth)acrylates, urethane (meth)acrylates, and polyacrylic (meth)acrylates.

4. The active energy ray-curable resin composition according to claim 1, further comprising a reactive diluent.

5. The active energy ray-curable resin composition according to claim 1,
   wherein the crosslinkable compound (A) and the oligomer (B) are present in a content ratio [(A)/(B)] by mass of 1/100 to 100/1.

6. The active energy ray-curable resin composition according to claim 1, further comprising a compound represented by the following formula (3):

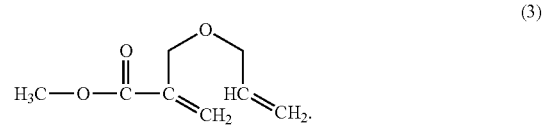

7. The active energy ray-curable resin composition according to claim 1, which is a 3D modeling resin composition.

8. Use of the active energy ray-curable resin composition according to claim 1 for production of a 3D modeling material.

9. A cured product comprising the active energy ray-curable resin composition according to claim 1.

* * * * *